April 8, 1952 W. A. AYRES 2,591,665
PROCESS OF LAMINATING PHOTOGRAPHIC
COLOR FILM TO GLASS
Filed June 24, 1947
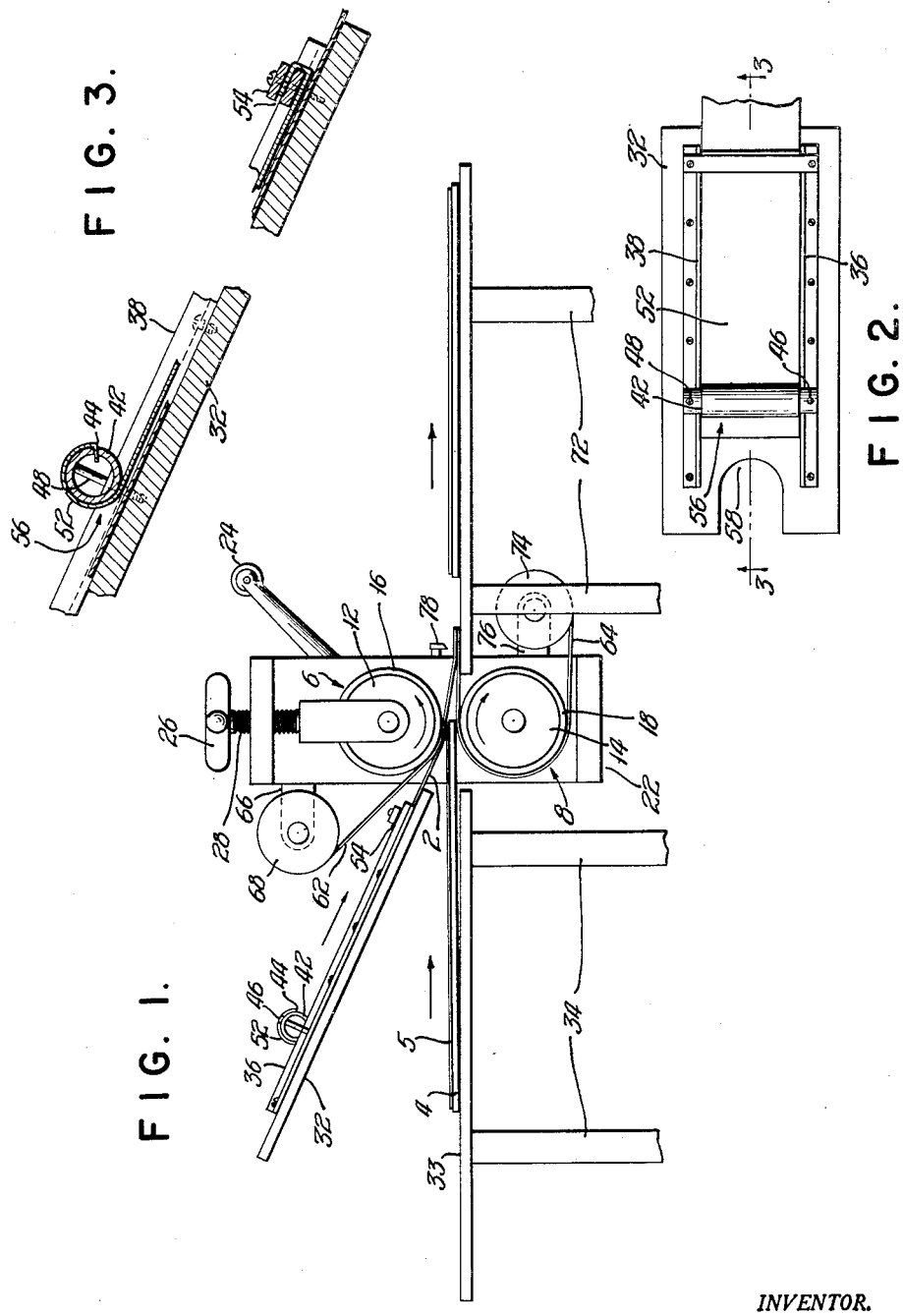
INVENTOR.
WALDEMAR A. AYRES
BY
Blair, Curtis & Hayward
ATTORNEYS.

Patented Apr. 8, 1952

2,591,665

UNITED STATES PATENT OFFICE 2,591,665

PROCESS OF LAMINATING PHOTOGRAPHIC COLOR FILM TO GLASS

Waldemar A. Ayres, Kew Gardens Hills, N. Y., assignor to The Sperry Corporation, a corporation of Delaware Application June 24, 1947, Serial No. 756,741

2 Claims. (Cl. 154—128)

This invention is concerned with imparting dimensional stability to plastic film. It relates more particularly to self-supporting color-sensitive photographic plates having a high degree of dimensional stability under varying conditions of humidity, temperature and age, and a process and apparatus for making such plates.

Color-sensitive photographic film of the subtractive type is produced by applying several layers of color-selective photographically-sensitive materials to a supporting base. The process of coating the base material must be carefully controlled in order to produce satisfactory film having the requisite speed and color characteristics. In order to achieve economical production, it therefore is necessary to employ a continuous coating process so that when the individual coating equipments are properly adjusted, uninterrupted production of large quantities of film may be achieved under uniform conditions. Flexible, colorless film materials, available in relatively long lengths, therefore, are employed as the base material and the resulting photographic film is entirely suitable for most applications.

However, in many instances, it is desirable that the film base be relatively rigid and self-supporting and in many instances that it have high precision dimensional stability, substantially unaffected by the developing processes, drying or subsequent aging, or by changes in temperature or relative humidity. Such stability is essential, for example, in the production of stereoscopic pictures, and especially in true-color reproductions, in which a stereo screen, such as, for example, lenticulations or line or pinhole screens, separate from the photographic record, are utilized to provide the selective recording and viewing of the image elements for the two eyes, necessary to create the stereoscopic effect.

In such stereoscopic pictures, the lenticulations which produce the stereoscopic effect need to have a high degree of dimensional stability, relative to the photographic image, as it is necessary to maintain the lenses or slits, etc., in proper relation to the exposed areas on the photographic film. Without such stability moiré and pseudoscopic effects and other defects, for example, changes in viewing distance, occur because of misalignment of the photographic film and the lenticulations. The transparent materials available in the commercial color photographic film are subject to dimensionsal changes during developing, drying, aging and under varying conditions of humidity, and the temperature coefficient of expansion of such materials is characteristically high.

It has heretofore been proposed to cement a lenticular screen to glass and subsequently to apply it, or a developed print, to paper or glass, with visual registration of the lenses with the developed line images of the print; but only the simple plastic lens screen was cemented. The photographic materials used with it were standard materials. With black and white prints this is feasible because glass plates are available which can be developed without excessive dimensional changes; but with multi-color film, glass plates are commercially unobtainable, and there are apparently insuperable obstacles to the commercial production of such color photographic plates on glass.

In accordance with the present invention, the reverse side of the flexible film, with the unexposed photo-sensitive emulsions on its face, is secured to a dimensionally-stable light-transmitting plate prior to exposure and development. It is highly desirable that the rigid stabilizing base material be free from any color which would distort the color balance or give an unpleasant tinting of the image. Glass, which fulfills the requirements of rigidity, dimensional stability, and lack of color, is a suitable base material; but, because of its brittle nature, and its inability to bond tightly with many adhesives, it imposes stringent requirements upon the bonding process, which to be feasible for this use must be sufficiently simple and reproducible that it can be executed readily in the absolute darkness which is necessary because there is no visible light which can be used safely with unexposed color film. The poor cohesion between glass and many of the available adhesives and transparent polymers suitable for photographic plates, and the inherent inability of glass to absorb or transmit solvents of the adhesive materials increases the difficulty of making a suitable bond. Heating, in general, must be avoided because of rapid deterioration of the photographic emulsion at the higher temperature; and thermoplastic adhesives are generally unsuitable for transparencies because of the heat to which they are subjected in light boxes, etc. In addition, uniform coating with solvents, or materials of similar low viscosity, is extremely difficult under the requisite condition of darkness.

It is therefore desirable to use a bonding system in which carefully selected adhesive agents are utilized to secure the polymer film to the glass plate. The bonding agents must have rigidity when set, i. e., the quality that no cold flow takes place with the extreme stresses resulting from temperature and humidity variations to which the film may be subjected, or from shrinkage during aging, and must not soften or permit cold flow even during the developing processes which may require long immersion in aqueous solutions and washing baths. The bonding agents themselves must not be damaged by the solutions utilized in the developing process nor contain soluble material that would adversely affect the developing solutions. There must, in addition, be uniform adhesion over the entire surface of the film and air bubbles or areas of poor adhesion must be eliminated completely. To meet the requirements of quantity production under darkroom conditions, there must also be sufficient immediate adhesion to hold the polymer film in place on the glass and prevent curling of the edges during any curing or hardening process. Because of the slowness of solvent evaporation due to inherent characteristics of the glass and polymer film, it is advantageous to obtain this immediate or preliminary adhesion by phenomenon not dependent upon solvent evaporation. The process steps available for use in the bonding is further limited by the requirement that static charges be avoided which might result in electrical discharges with consequent ionization and emission of light which would expose the sensitized layers of the film. In addition, the adhesive material after setting, as well as the glass backing, must be capable of transmitting light and preferably be transparent and colorless.

Accordingly, it is an object of this invention to provide an improved method of bonding plastic, cellulosic, and other flexible polymer materials to glass surfaces. It is another object to provide an improved method of imparting dimensional stability to photographic film.

It is a more specific object to provide a method of imparting dimensional stability to unexposed color-sensitive film.

It is another object of this invention to provide, as an article of manufacture, a polymer-on-glass laminated plate, which is dimensionally stable, and so resistant to immersion in water and chemical solutions as to be suitable for use in a color-sensitive photographic plate.

It is a further object of this invention to provide such a plate in which the photographically coated, light-sensitive film is so permanently secured to a glass plate that the adhesion and the dimensional relations between them are unaffected by treatment in the processing and washing baths, drying, etc., to which the photographic plate may be subjected, or by the heat and dry atmosphere of a light box, which may be used for viewing, or by the aging of the film or the adhesive.

It is another object of this invention to provide bonding apparatus suitable for producing such a laminated photographic plate.

A more specific object is to provide such apparatus in which the sensitized surface of the flexible film is maintained in a substantially flat condition while being moved into the joining position and is protected from excessive pressure and metallic contamination.

Still another object is to provide such apparatus in which the pressure exerting members are continuously protected from contamination by adhesive or other materials.

The invention, accordingly, contemplates the securing of a flexible film of high polymer material to a glass plate; in one aspect being particularly concerned with unexposed, color-selective, photographic plates and in another aspect with apparatus for performing the bonding operation.

Further objects and advantages of the present invention will be apparent from the consideration of the following description taken in conjunction with the accompanying drawing in which:

Fig. 1 shows an apparatus suitable for bonding the flexible plastic film to the glass in accordance with the invention;

Fig. 2 shows a top view of an inclined plane for guiding the flexible plastic film; and Fig. 3 shows a cross section of the inclined plane taken on line 3—3 of Fig. 2.

The apparatus for performing the bonding operation is to be operated under suitable darkroom conditions and is illustrated as hand-operated, but may be adapted for high speed automatic operation.

The unexposed color-sensitive photographic film 2 is bonded to a glass plate 4 by progressively joining the film to the glass plate, which has been previously coated with an adhesive 5, for example, a liquid casein and rubber emulsion type, by means of a doctor blade, rollers, or other suitable mechanism (not shown), by passing the film 2 and glass 4 simultaneously between the two rolls, generally indicated at 6 and 8, having steel center portions 12 and 14 and outer coatings of soft rubber 16 and 18 respectively. The rolls 6 and 8 are mounted in a frame, generally indicated at 22, and are adapted by a suitable gear mechanism (not shown) to be driven (in a direction indicated by the arrows) by a hand crank 24. The spacing, and consequently the pressure exerted between the rolls, is controlled by a hand wheel 26 connected through a screw 28 to the upper roll 6. The adjustment of the space between rollers 6 and 8 by the hand wheel 26 through screw 28 is necessary for adjusting the apparatus so that it may handle films of varying thicknesses. As will be pointed out below, the spacing between the rollers 6 and 8 is very critical since this spacing determines the pressure which is applied in bonding the film to the adhesive coated plate 4. Therefore, a different spacing and consequently a different pressure is required for each different thickness of film being handled by the present apparatus. A skilled operator will set the hand wheel 26 for a particular thickness film to a position which will supply the proper amount of pressure to insure an initial bond between the film and the plate, which bond is secure enough to prevent curling of the edges. Then he will index the hand wheel position for that particular film. He will repeat the indexing operation for every thickness film being handled. In this manner, a predetermined pressure will be applied to the film in bonding it to the adhesive-coated plate.

In order to prevent uneven distribution of the adhesive 5 and inclusion of bubbles between the bonded layers, it is advantageous to join the film 2 to the adhesive-coated glass 4 at the point where the film and glass enter the bight of the rolls 6 and 8. This is accomplished by providing an inclined plane 32, on which is placed the sheet of photographic film 2 with the sensitized side upward, and feeding the film to the rolls by sliding it downwardly along this plane so that it first strikes the outer surface of the upper roll 6 and is joined to the adhesive-coated surface of the glass 4 at the bight of the rolls. With this condition of operation, a small excess of adhesive is retained between the film and the glass, just ahead of the point at which the pressure of the rolls is applied, and which moves progressively across the adjacent surfaces of the film and glass as they are passed through the rolls, thus assuring even distribution of the adhesive and uniform thickness of material between the rolls.

The glass plate 4, under the pressure exerted by the rolls, will assume a position with its surface tangent to the surfaces of the rolls at the points where they contact the glass. In order to avoid breakage, it is, therefore, important that the longitudinal axis of rolls 6 and 8 be in proper vertical alignment with respect to the upper surface 33 of the table 34 which initially supports the glass plate 4, and that the upper surface of the lower roll 8 be positioned slightly above the surface 33 so that as the glass plate is moved forwardly to engage the rolls, its forward edge is lifted from the surface of the table as the glass plate is drawn into the bight of the rolls.

The dimensions of the glass plate 4 advantageously are slightly larger than the corresponding dimensions of the film 2 in order that the glass plate will extend beyond the edges of the film to permit convenient handling of the finished plate without danger of accidentally stripping the edge of the film 2 from the plate 4. The leading edges of the film and glass plate may be adjusted conveniently by advancing the glass plate toward the right until the leading edge just enters the bight of the rolls. The photographic film is then moved downwardly along the inclined plane 32, contacting first the surface of the upper roll 6 and then the glass plate 4. The hand crank 32 is then rotated, the glass plate 4 and film 2 advancing between the rolls with the film 2 making initial contact with the adhesive-coated glass plate 4 just back of the leading edge of the glass plate.

It is desirable to provide guides to assure proper lateral positioning of the film when it joins the glass plate, together with an arrangement to prevent curling of the photographic film while it is on the inclined plane 32 which is so constructed that it does not injure the sensitized surface of the photographic film which is easily scratched, is sensitive to excessive pressure, and is readily contaminated by many metals.

In order to provide lateral positioning of the film, two vertical guide strips 36 and 38, preferably adjustable, are secured to the upper surface of the inclined plane 32. Near the upper end of this inclined plane, a length of pipe 42 is secured by suitable means across and spaced above the inclined plane. A longitudinal slit 44 extends throughout the length of the pipe 42 and which may be closed by tightening two screws 46 and 48. The end of a sheet 52 of smooth flexible material, for example, cellophane or cellulose acetate, is placed in the slit 44 and secured therein by tightening the screws 46 and 48. The flexible sheet 52 passes counterclockwise, as seen in Fig. 1, around the pipe 42 and extends downwardly along, and just above, the upper surface of the inclined plane 32 and is suitably secured, after being drawn taut, to a rod 54 extending across the inclined plane. A channel is thus formed, for the passage of the film sheet, bounded on the two sides by the guide bars 36 and 38, on the bottom by the inclined plane 32, and on the top by the smooth inert film 52. The entrance 56 to this channel is funnel-shaped by virtue of the cylindrical shape of the pipe 42, which is covered with the flexible sheet 52, so that the photographic film may be readily inserted. A suitable opening 58 is provided in the inclined plane so that the film may be guided readily by hand into the channel. The photographic film is thus prevented from curling, and the sensitized surface protected from excessive pressure, and metallic contamination as it approaches the pressure rolls 6 and 8.

As the film and glass plate are pressed together by the rolls, any excess adhesive is squeezed out along the sides and at the trailing edge of the photographic film. If suitable precautions were not taken, this adhesive would quickly contaminate the rolls and thus be transferred to the sensitized surface of the film. In order to prevent such contamination, a protective sheet or blanket is used over the face of each roll. Advantageously this blanket is absorbent so as to "blot" up the adhesive and keep it from spreading onto the faces of the film or the glass plate. The blanket may be advantageously of paper, so arranged that it passes through the rolls as the bonding operation is performed, one layer, such as paper 62, being adjacent the upper roll and another layer, such as paper 64, being adjacent the surface of the lower roll. A continuous supply of clean paper is assured by mounting a bracket 66 on the upper portion of the frame 22 and rotatably supporting thereon a roll 60 of the paper 62 in the position shown. The paper 62 passes downwardly against the surface of the upper roll 6, between the rolls, and to the right toward the receiving table 72. A second roll 74, mounted rotatably on a bracket 76 affixed to the lower portion of the frame 22 supplies the paper 64 which extends horizontally to the left, around the lower roll 8 and back between the rolls to the receiving table 72. Thus, as the glass plate and photographic film are passed between the rolls, any excess adhesive is collected by the paper, which at the completion of the operation is separated from the supply rolls by cutting with a serrated knife edge 78 suitably mounted on the frame 22. The two layers of paper are then removed carefully from the sensitized surface and from the reverse side of the glass plate.

If desired two smooth edged bars may replace the knife 78 and the two sections of blanket material pulled back over their respective bars so as to strip the protective material from the composite photographic plate, instead of tearing the sheets. The blanket may thus be made continuous and passed through suitable washing and rinsing baths and a drier and returned to again protect the rolls.

The operation may be summarized as follows: The glass plate 4 is coated with the adhesive 5 and placed upon the surface 33 of table 34. The photographic film is placed, sensitized side upward, in the entrance 56 to the channel on the inclined plane 32. The glass plate 4 is advanced toward the right until it is in contact with the paper-covered surface of roll 8 and the hand crank 24 is rotated until the leading edge of the glass plate, climbing upwardly on roll 8, just reaches the bight of the rolls. The photographic film is then moved downwardly along the inclined plane making contact first with the paper-covered surface of roll 8, and then with the adhesive-coated glass plate 4 just back of the leading edge of the glass plate. As the rotation of the hand crank 24 continues, the glass plate 4 and film 2 move to the right through the rolls, together with paper 62 and 64, the film being pressed progressively against the adhesive, securing immediate preliminary adhesion and squeezing out all air and excess adhesive progressively so as to prevent the formation of air bubbles. After the joining of the film 2 to the glass plate 4, the resulting self-supporting photographic plate is received by table 72.

The photographic plate is, of course, covered top and bottom with the layers of paper which are connected to supply rolls 68 and 74. The photographic plate is then lifted from the surface of table 72 and the layers of paper torn off along the serrated knife 78. The sheets of paper are then stripped from the surfaces of the composite photographic plate which is then placed in a light-tight box (not shown), provided with suitable air circulation, for a length of time, say 12 hours, sufficient to permit hardening of the adhesive to form a permanent chemically irreversible bond between the film and the glass. By the term "chemically irreversible bond" is meant a bond which after setting or drying will no longer be redissolved in water nor softened by any liquid which is used in processing the color film, i. e., the developing, fixing, and washing baths.

In carrying out the preferred process of this invention, the reverse side of the base film, which in this example is cellulose acetate or nitrate, is provided in the usual manner with a coating of gelatin. It is this gelatin coating then that is pressed into firm contact with the adhesive 5 which is preferably a liquid casein and rubber latex, emulsion-type adhesive which sets when, as above described, a pressure of sufficient magnitude is applied to the film to remove by absorption into the gelatin or to the absorbent backing sheets, a predetermined amount of water vehicle, to cause inversion of phases of the oil-in-water type emulsion to a water-in-oil type. The latex may be, and commonly is, a so-called "synthetic latex" or artificial dispersion of rubber (synthetic or natural), usually dissolved in an organic solvent, with emulsifying and stabilizing agents, as well known in the art. Casco Flexible Cement No. NT-508, manufactured by Casein Co. of America, is such a cement which is commercially available so that it can be conveniently used in this process. Instead of rubber other water-insoluble transparent polymers may be used, e. g., polyvinyl compounds, polyethenes, especially polybutene, etc., which may be similarly dispersed into a latex. The use of the gelatin coating on the plastic surface has been found to be advantageous, presumably because the gelatin immediately absorbs, under the pressure of the rolls, sufficient water to produce the initial setting of the adhesive, thereby providing preliminary adhesion sufficient to prevent curling of the plastic film near the edges. The importance of this function of the gelatin depends upon the weight and type of the flexible film which is employed, and the relative humidity and temperature conditions under which the process is carried out. In special cases, the gelatin coating may be omitted and the film base secured directly to the glass by the casein-latex emulsion.

The unexposed photographic plate resulting from such lamination has the high dimensional stability of glass and satisfactorily meets all of the requirements necessary in producing three dimensional effects by the use of lenticulated surfaces.

Although there is shown and descibed a preferred embodiment of the invention using a particular plastic film and a particular adhesive, it is to be understood that these are not intended to be exhaustive or limiting of the invention but on the contrary are given for purposes of illustration in order that those skilled in the art may fully understand the invention and the principles thereof and the manner of applying it in practical use so that they may modify and adapt it in various forms, each as may be suited to the conditions of a particular use.

I claim:

1. The process of manufacturing a dimensionally stable color-sensitive photographic plate adapted for use in three dimensional pictures and comprising the steps of coating one side of a cellulose acetate film with a plurality of substractive type photosensitive color-recording layers, coating the opposite side of said cellulose acetate film with gelatin dispersed in water, removing said water and hardening said gelatin on said cellulose acetate, coating a glass plate with an emulsion-type adhesive comprising casein and latex in an aqueous vehicle which sets when a sufficient amount of the water vehicle is lost to cause inversion of phases of the emulsion, and progressively joining and pressing the adhesive-coated glass plate to the gelatin-coated side of said cellulose acetate film with a predetermined amount of pressure to thereby produce immediate adhesion, whereby to prevent curling of the cellulose acetate film.

2. The process of producing a dimensionally stable color-sensitive photographic plate adapted for use in the production of three dimensional pictures of the type employing a stereo screen for producing the stereoscopic effect separate from the photographic record comprising the steps of, coating one side of a cellulose acetate film with a plurality of subtractive type photosensitive color-recording layers, coating the opposite side of said cellulose acetate film with gelatin dispersed in water, removing said water and hardening said gelatin on said cellulose acetate film whereby to provide a dry gelatin-coated film, coating one side of a glass plate with an emulsion-type adhesive comprising casein and latex in a water vehicle which sets upon loss of the water vehicle to cause an inversion of the emulsion from an oil-in-water type emulsion to a water-in-oil type emulsion, covering the one side of said cellulose acetate film with a water-absorbent sheet and covering the other side of said glass plate with a water absorbent sheet, progressively joining the adhesive-coated side of said glass plate with the gelatin-coated side of said cellulose acetate film under a predetermined pressure to thereby displace a portion of the water vehicle of said adhesive, whereby said displaced water vehicle will be absorbed by the gelatin on the surface of said film and also at the periphery of said film by said water-absorbent sheets, removing the water-absorbent sheets from said film and plate, and finally drying the joined film and plate at room temperature to thereby remove the remainder of the water-vehicle from said adhesive.

WALDEMAR A. AYRES.

(References on following page)

REFERENCES CITED

The following references are of record in the file of this patent:

UNITED STATES PATENTS

| Number | Name | Date |
| --- | --- | --- |
| 1,261,542 | Ives | Apr. 2, 1918 |
| 1,306,904 | Ives | June 17, 1919 |
| 1,342,268 | Mascart | June 1, 1920 |
| 1,478,862 | Rosenthal | Dec. 5, 1923 |
| 1,612,079 | Tolnay et al. | Dec. 28, 1926 |
| 2,058,703 | Malivert | Oct. 27, 1936 |
| 2,154,474 | Scott | Apr. 18, 1939 |
| 2,167,732 | Verkindenen | Aug. 1, 1939 |
| 2,303,087 | Neller | Nov. 24, 1942 |
| 2,311,889 | Toland | Feb. 23, 1943 |
| 2,418,304 | Hutchinson | Apr. 1, 1947 |

OTHER REFERENCES

Kodak Reference Handbook, Copyright November 1940. Printed by Eastman Kodak Co. "Slides and Transparencies" pp. 1026 cited.

Marchionna, "Latex and Rubber Derivatives and their Industrial Applications," vol. II, page 172, page 649, paragraph 4281, page 651, paragraphs 4287, 4288, particularly cited; published by The Rubber Age, 250 West Fifty Seventh St., N. Y. C. 1937.